(No Model.)
H. C. SHAW.
MOUNTING FOR MILLSTONES.
No. 495,642. Patented Apr. 18, 1893.
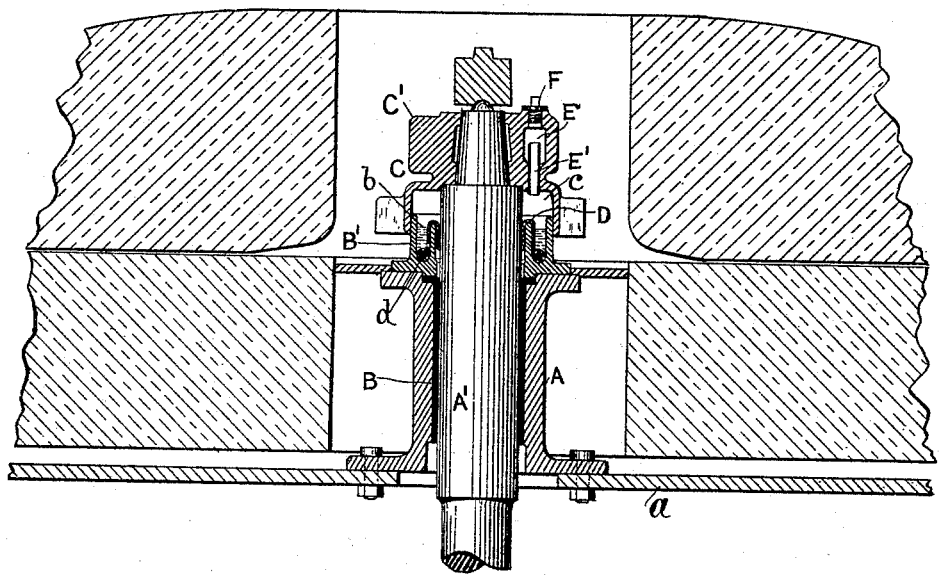
Witnesses
Peter A Ross
Herbert Blossom
Inventor
Harry C. Shaw
Henry Connett
Attorney

UNITED STATES PATENT OFFICE.

HARRY C. SHAW, OF SUTTON, ENGLAND, ASSIGNOR OF TWO-THIRDS TO JOHN CRONE AND DAVID CRONK TAYLOR, OF SAME PLACE.

MOUNTING FOR MILLSTONES.

SPECIFICATION forming part of Letters Patent No. 495,642, dated April 18, 1893.

Application filed August 13, 1892. Serial No. 442,976. (No model.) Patented in England October 15, 1891, No. 17,625.

*To all whom it may concern:*

Be it known that I, HARRY CLAYTON SHAW, a subject of the Queen of Great Britain, residing at Sutton, in the county of Lancaster, England, have invented certain new and useful Improvements in Mountings for Millstones, (for which I have obtained Letters Patent in Great Britain, No. 17,625, dated October 15, 1891,) of which the following is a specification.

This invention has for its object a method of and device for mounting mill stones, whereby the neck bearings are much better lubricated than has hitherto been the case, and, at the same time, kept perfectly free from dust. The said bearings can be lubricated without difficulty during the stoppage of the mill of a few minutes, and, by reason of the improved lubrication, the mill stones can be run for longer periods without re-mounting.

The invention will be best understood by referring to the accompanying drawing, which is a vertical section of the improved device applied to a pair of stones.

A, is the central bush usually fixed to the stone, but, in this improved device, it is attached to and supported by the pan $a$, or it may be, if desired, formed in one with the pan. B is a brass or bronze lining forming a bearing for the spindle A'. Immediately above the bush A and resting on it, as ordinarily, is the gland B', but this gland has an annular space $b$ to receive the oil, hereinafter called the oil-reservoir. The sweep C, instead of being a separate piece, as is usually the case, is herein shown as formed in one with the sweep box C' (though of course, if desired, it may be a separate piece) and is turned or provided with a lid or cover $c$ which surrounds the oil reservoir B' and prevents any dust from getting to the bearings. When the sweep and sweep box are made separately, the sweep or cover is bored and tapped and fitted with a pipe E' which passes up said bore and meets the plug F. Whether the sweep and sweep box be in one or separate, it may in some cases be desirable to make use of a reserve oil-chamber E, and whenever such is made use of the conduit pipe, E', should be employed, as a wick may then be used to siphon over oil from chamber E down the pipe E' onto the parts to be lubricated; that is, the overlapping edges of the cover and gland and into the gland. In the annular space aforesaid is placed worsted or other material, which, besides acting as a siphon, may catch any dirt that should happen to get in. A ring $d$, of wire, will be found advantageous to keep the wick D in position. There is a space of an inch or so left between the lower face of the sweep C and the top of the gland B', and the cover $c$ on the sweep overlaps the gland to about the same extent. This construction allows the stones to be regulated properly.

The mode of action is as follows:—The spindle A' having been properly aligned and the brass or bronze bearing B inserted, the combined sweep and sweep box is placed in position with the sweep C and cover $c$ a little overlapping the oil reservoir B'. The latter is then filled with the lubricant by means of chamber E and tube E', and the plug F is inserted. The oil is fed to the neck bearing by means of the siphon wick D. This constant and regular lubrication of the spindle insures the more regular and freer working of the stones. The above description refers more particularly to the device when used in connection with a pair of stones resting in an iron pan, but it can be adapted to every description of stones irrespective of the thickness, or the nature of the supports. It is, however, preferable to fix the improved device to the pan or other support independent of the stone, so that the bedstone can be raised from time to time, as it wears, without disturbing the neck bearing or reservoir. The runner is driven by a cross-bar or driver on the cock-head, as usual. This driver is seen in transverse section in the drawing.

Having thus described my invention, I claim—

1. In a mounting for millstones, the combination with the mill spindle, of an oil box or reservoir B', placed at the spindle-head with the bush A as its seating, and a sweep box C', and sweep C, provided with means for the introduction of the lubricant, said parts being arranged to inclose and embrace the part of the mill spindle which projects into the eye of the stone, substantially as set forth.

2. In a mounting for millstones, the combination with the spindle, and the bush and its lining, forming a bearing for the spindle, of the gland B', mounted on the bush and embracing the spindle, said gland having a bore of greater diameter than the spindle, and an annular space, $b$, in its top to receive oil, and wicks extending from said space $b$ over the inner wall of the gland and down between said wall and the spindle, as set forth.

3. In a millstone mounting having an oil-box or reservoir, B', a sweep so arranged that it will act as a cover or lid to such box or reservoir, substantially as set forth.

4. In a mounting for millstones, the combination with a non-rotative, annular reservoir for oil, about the spindle, and a rotative sweep forming a cover for the same, of a sweep box C', above said cover, provided with an oil reservoir E and a passage leading from said reservoir down within said cover to convey oil to the joint between the cover and the outer wall of the lower reservoir, the surplus oil flowing into the latter, as set forth.

5. In a millstone mounting, the combination with the spindle, of an annular oil-box about the spindle and circular exteriorly, of the sweep arranged over said box and having a pendent circular flange which takes over and embraces the upper part of the box, forming the cover for the same.

6. In a millstone mounting, the combination with the spindle, and an annular oil-box about the same, of a sweep arranged over the oil-box and forming a cover for the same, the sweep having an oil-passage through it for the introduction of lubricant to the box.

In testimony whereof I have signed my name to this specification in the presence of two subscribing witnesses.

HARRY C. SHAW.

Witnesses;
 JOHN HAYES,
 H. P. SHOOBRIDGE.